(12) United States Patent
Jin et al.

(10) Patent No.: US 8,964,729 B2
(45) Date of Patent: **\*Feb. 24, 2015**

(54) METHOD, EQUIPMENT AND MOBILE COMMUNICATION SYSTEM FOR REALIZING EXPLICIT CALL TRANSFER

(75) Inventors: Hui Jin, Shenzhen (CN); Shuiping Long, Shenzhen (CN); Xiaoyan Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,638

(22) Filed: Oct. 3, 2011

(65) Prior Publication Data

US 2012/0026919 A1 Feb. 2, 2012

Related U.S. Application Data

(63) Continuation of application No. 12/882,722, filed on Sep. 15, 2010, which is a continuation of application No. PCT/CN2009/071829, filed on May 18, 2009.

(30) Foreign Application Priority Data

Jun. 13, 2008 (CN) .......................... 2008 1 0111297

(51) Int. Cl.
*H04L 12/66* (2006.01)
*H04M 3/58* (2006.01)
(Continued)

(52) U.S. Cl.
CPC ............. *H04M 3/58* (2013.01); *H04L 65/1016* (2013.01); *H04L 65/1083* (2013.01); *H04M 7/006* (2013.01)
USPC ........................... 370/352; 370/338; 370/389

(58) Field of Classification Search
CPC ............ H04L 65/1016; H04L 65/1083; H04L 65/1073; H04L 65/1096; H04L 67/14; H04L 29/06319; H04W 80/10; H04W 60/00; H04W 36/0027; H04W 36/0011; H04W 36/0005; H04W 76/021; H04W 76/02; H04W 76/022; H04W 48/18
USPC .......................................... 370/352, 389, 338
See application file for complete search history.

(56) References Cited

U.S. PATENT DOCUMENTS 6,940,848 B1  9/2005 Liu et al.
2006/0092970 A1  5/2006 Song et al.
(Continued)

FOREIGN PATENT DOCUMENTS

CN  1882020  12/2006
CN  1882020 A  12/2006
(Continued)

OTHER PUBLICATIONS

Written Opinion of the International Searching Authority, mailed Aug. 27, 2009, in International Application No. PCT/CN2009/071829 (3 pp.).

(Continued)

*Primary Examiner* — Asad Nawaz
*Assistant Examiner* — Stephanie Chang
(74) *Attorney, Agent, or Firm* — Staas & Halsey LLP (57) ABSTRACT

A method, equipment, and a mobile communication system for realizing explicit call transfer are provided. The method for realizing explicit call transfer includes the following steps. A service centralization & continuity application server (SCC AS) receives a call request sent by a second user equipment (UE), and sends the call request to a third UE, in which an instruction for replacing a call between a first UE and the third UE is carried in the call request. A message returned by the third UE according to the call request is received, and the third UE is controlled to establish a connection with the second UE and to break a connection with the first UE. The third UE is an IP multimedia subsystem centralized service user equipment (ICS UE).

5 Claims, 9 Drawing Sheets

(51) Int. Cl.
*H04L 29/06* (2006.01)
*H04W 4/00* (2009.01)
*H04L 12/28* (2006.01)
*H04L 12/56* (2006.01)
*H04M 7/00* (2006.01)

(56) References Cited

U.S. PATENT DOCUMENTS

2008/0175229 A1* 7/2008 Lee .............................. 370/352
2009/0086719 A1* 4/2009 Mutikainen et al. .......... 370/352

FOREIGN PATENT DOCUMENTS

| | | |
|---|---|---|
| CN | 101043751 | 9/2007 |
| CN | 101043751 A | 9/2007 |
| CN | 101115237 | 1/2008 |
| CN | 101115237 A | 1/2008 |
| CN | 101183960 | 5/2008 |
| CN | 101527894 | 10/2010 |
| ES | 2248296 | 11/2002 |
| WO | 01/65819 | 9/2001 |
| WO | 2008/027407 | 3/2008 |

OTHER PUBLICATIONS

Extended European Search Report, mailed Jul. 19, 2011, in European Application No. 09761260.0 (6 pp.).
International Search Report for PCT/CN2009/071829, mailed Aug. 27, 2009.
British Office Action issued Dec. 20, 2011 in corresponding British Patent Application No. GB1014636.3 (2 pages).
*3rd Generation Partnership Project; Technical Specification Group Services and System Aspects; IP Multimedia Subsystem (IMS) Centralized Services; Stage 2 (Release 8)*, 3GPP TS 23.292 V8.0.0, Jun. 2008, pp. 1-89.
Examination Report under Section 18(3), mailed Dec. 20, 2011, in corresponding British Application No. GB1014636.3 (2 pp.).
Office Action, mailed Dec. 23, 2011, in corresponding U.S. Appl. No. 12/882,722 (14 pp.).
Final US Office Action issued Jul. 30, 2012 in parent copending U.S. Appl. No. 12/882,722 (16 pages).
U.S. Appl. No. 12/882,722, filed Sep. 15, 2010, Hui Jun et al., Huawei Technologies Co., Ltd.
Notice of Allowance mailed Oct. 24, 2014 in parent U.S. Appl. No. 12/882,722 (9 pages).

* cited by examiner

METHOD, EQUIPMENT AND MOBILE COMMUNICATION SYSTEM FOR REALIZING EXPLICIT CALL TRANSFER

CROSS-REFERENCE TO RELATED APPLICATIONS

This application is a continuation of U.S. patent application Ser. No. 12/882,722, filed on Sep. 15, 2010, which is a continuation of International Application No. PCT/CN2009/071829, filed on May 18, 2009. The International Application claims priority to Chinese Patent Application No. 200810111297.3, filed on Jun. 13, 2008. The afore-mentioned patent applications are hereby incorporated by reference in their entireties.

FIELD OF THE TECHNOLOGY

The present invention relates to the field of communications technology, and more particularly to a method, equipment, and a mobile communication system for realizing explicit call transfer.

BACKGROUND

At present, circuit-switched (CS) networks, such as global system for mobile communication (GSM) networks and code division multiple access (CDMA) networks, dominate the mobile communication network; and operators have established complete and abundant service platforms based on the CS networks. An IP multimedia subsystem (IMS) that supports various services like audio, video, and data, is regarded as a core technique of a next generation network that integrates mobile and fixed communication networks. The IMS network structure is too complex to complete all-round deployment within a short period of time; therefore, the CS network will coexist with the IMS network for a certain period. However, operation costs will definitely increase for operating a CS service platform and an IMS service platform at the same time. To reduce the operation costs, it is hoped that functions of the CS network service platform can be transferred to the IMS network to integrate the service platforms. An IMS centralized service (ICS) project is proposed to meet the requirement of the service platform integration; and the main task is to realize that user equipment (UE) establishes an IMS call by bearing audio media through a CS network, where the CS bearer is realized by establishing a CS call between the UE and a service centralization & continuity application server (SCC AS). The SCC AS completes an adaptation from CS domain signaling to IMS domain session initiation protocol (SIP) signaling Messages between the UE and the SCC AS can be transmitted through a packet switched service control signaling channel or a circuit switched service control signaling channel. The packet switched service control signaling channel is also known as a Gm interface, and the circuit switched service control signaling channel is also known as an Il interface. Comparing with the Il interface, the Gm interface has advantages of transferring more information and abundant contents. It is suggested in a standard that when both a Gm and an Il interface are available, the Gm interface is preferred as a channel for session control message transmission. And the Il interface is selected as a channel for session control message transmission when there is only a CS domain connection.

Figure 1:
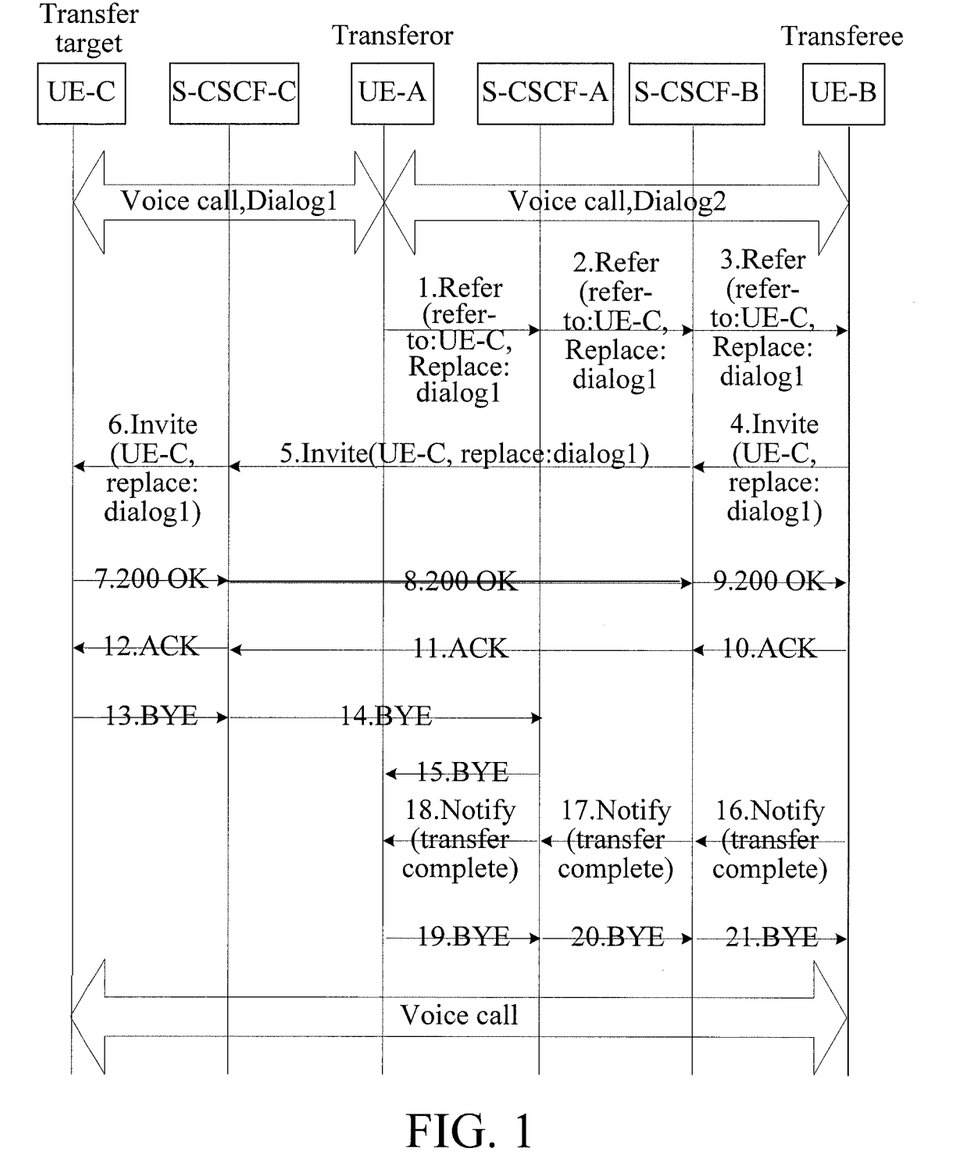
FIG. 1 is a schematic flow chart of a consult ECT of the prior art.

Explicit call transfer (ECT), as a supplementary service of mobile communication, provides a method for transferring a communication party during an existing call for users. The ECT may be either a blind transfer or a consult transfer. When a user A is communicating with a user B and a user C at the same time, and the user B and the user C are in a state of call holding, the user A wants the user B to communicate with the user C, so the UE-A initiates a consult ECT process, details of which are shown as FIG. 1. After a step 21 is executed, the UE-B starts session connection with the UE-C, the connection between the UE-A and the UE-B, and the connection between the UE-A and the UE-C are broken.

In the above process, the UE-A is known as a transferor, which initiates an ECT request; the UE-B is known as a transferee, which is configured to receive the ECT request and execute an ECT service; and the UE-C is known as a transfer target, which is a calling target of the transferee. In order to achieve the integration of the ECT service between a CS network and an IMS network, in the ICS project, methods for a consult ECT using an IMS centralized service user equipment (ICS UE) as a transferor or as a transferee have already been provided. However, currently no method has been provided for using an ICS UE as a transfer target to realize a consult ECT. That is, the standard for the consult ECT service in the ICS project is not complete, manufacturers cannot produce relevant equipment according to the standard, and thus the ICS consult ECT service cannot be put into practical use.

SUMMARY OF THE INVENTION

In view of this, the embodiments of the present invention provide a method, equipment, and a mobile communication system for realizing explicit call transfer, so as to complete the standard of a consult ECT service in an ICS project, and solve the problem that an ICS consult ECT service cannot be put into practical use. The technical solution is described as follows:

In an embodiment, the present invention provides a method for realizing explicit call transfer. The method includes the following steps:

A call request sent by a second UE is received, and the call request is sent to a third UE, in which an instruction for replacing a call between a first UE and the third UE is carried in the call request.

A message returned by the third UE according to the call request is received, the third UE is controlled to establish a connection with the second UE and to break a connection with the first UE.

The third UE is an ICS UE.

In an embodiment, the present invention further provides a service centralization & continuity application server (SCC AS) that serves an IMS centralized service user equipment (ICS UE). The SCC AS includes a call request forwarding unit, a connection establishment control unit, and a connection break control unit, The call request forwarding unit is configured to receive a call request message sent by a second UE, and send the call request message to a third UE, where an instruction for replacing a call between a first UE and the third UE is carried in the call request.

The connection establishment control unit is configured to receive a message returned by the third UE according to the call request, and control the third UE to establish a connection with the second UE.

The connection break control unit is configured to receive a message returned by the third UE according to the call request, and control the third UE to break a connection with the first UE.

The third UE is an ICS UE.

In an embodiment, the present invention further provides another SCC AS that serves an ICS UE. The SCC AS includes a call request forwarding unit, a return message receiving subunit, a connection establishment control subunit, and a connection break control subunit.

The call request forwarding unit is configured to receive a call request message sent by a second UE, and send the call request message to a third UE, where an instruction for replacing a call between a first UE and the third UE is carried in the call request.

The return message receiving subunit is configured to receive a message returned by the third UE according to the call request.

The connection establishment control subunit is configured to control the third UE to establish a connection with the second UE according to the message received by the return message receiving subunit.

The connection break control subunit is configured to control the third UE to break a connection with the first UE according to the message received by the return message receiving subunit.

In an embodiment, the present invention further provides an ICS UE. The ICS UE includes a call request receiving unit, a connection establishing unit, and a connection breaking unit.

The call request receiving unit is configured to receive a call request sent by a second UE and forwarded by an SCC AS, where an instruction for replacing a call between a first UE and the SCC AS is carried in the call request.

The connection establishing unit is configured to return a message to the SCC AS according to the call request received by the call request receiving unit, and establish a connection with the second UE by using the return message.

The connection breaking unit is configured to return a message to the SCC AS according to the call request received by the call request receiving unit, and break a connection with the first UE by using the return message.

In an embodiment, the present invention further provides another ICS UE. The ICS UE includes a call request receiving unit and a connection updating unit.

The call request receiving unit is configured to receive a call request sent by a second UE and forwarded by an SCC AS, where an instruction for replacing a call between a first UE and the SCC AS is carried in the call request.

The connection updating unit is configured to return a message to the SCC AS according to the call request received by the call request receiving unit, and, by using the return message, establish a connection with the second UE and break a connection with the first UE.

In an embodiment, the present invention further provides a mobile communication system. The system includes three user terminals, namely, a transferor, a transferee, and a transfer target, and an SCC AS. The transfer target is an ICS UE.

The transferor is configured to initiate a call transfer request.

The transferee is configured to receive the call transfer request initiated by the transferor, and send a call request to the transfer target.

The SCC AS is configured to receive the call request sent by the transferee, and send the call request to the transfer target; receive a message returned by the transfer target according to the call request, establish a connection with the transferee, and break a connection with the transferor.

The transfer target is configured to receive the call request sent by the SCC AS, return a message to the SCC AS according to the call request, and instruct the SCC AS to establish the connection with the transferee and to break the connection with the transferor.

The preceding technical solution standardizes a situation of using an ICS UE as a transfer target of a consult ECT service, which completes the standard of the consult ECT service in an ICS project. Manufacturers can produce relevant equipment according to the complete standard to put the ICS consult ECT service into practical use; session connection status between ICS UEs can be more flexibly controlled to transfer a communication party. Therefore, better experience to users is provided.

DETAILED DESCRIPTION OF THE EMBODIMENTS

A method for realizing explicit call transfer according to an embodiment of the present invention is described first. The method includes the following steps:

A call request sent by a second UE is received, and the call request is sent to a third UE, where an instruction for replacing a call between a first UE and the third UE is carried in the call request. A message returned by the third UE according to the call request is received, the third UE is controlled to establish a connection with the second UE, and is controlled to break a connection with the third UE and the first UE. The third UE is an ICS UE.

Hereinafter, embodiments of the present invention are described in detail with reference to the accompanying drawings.

Embodiment 1

Figure 2A:
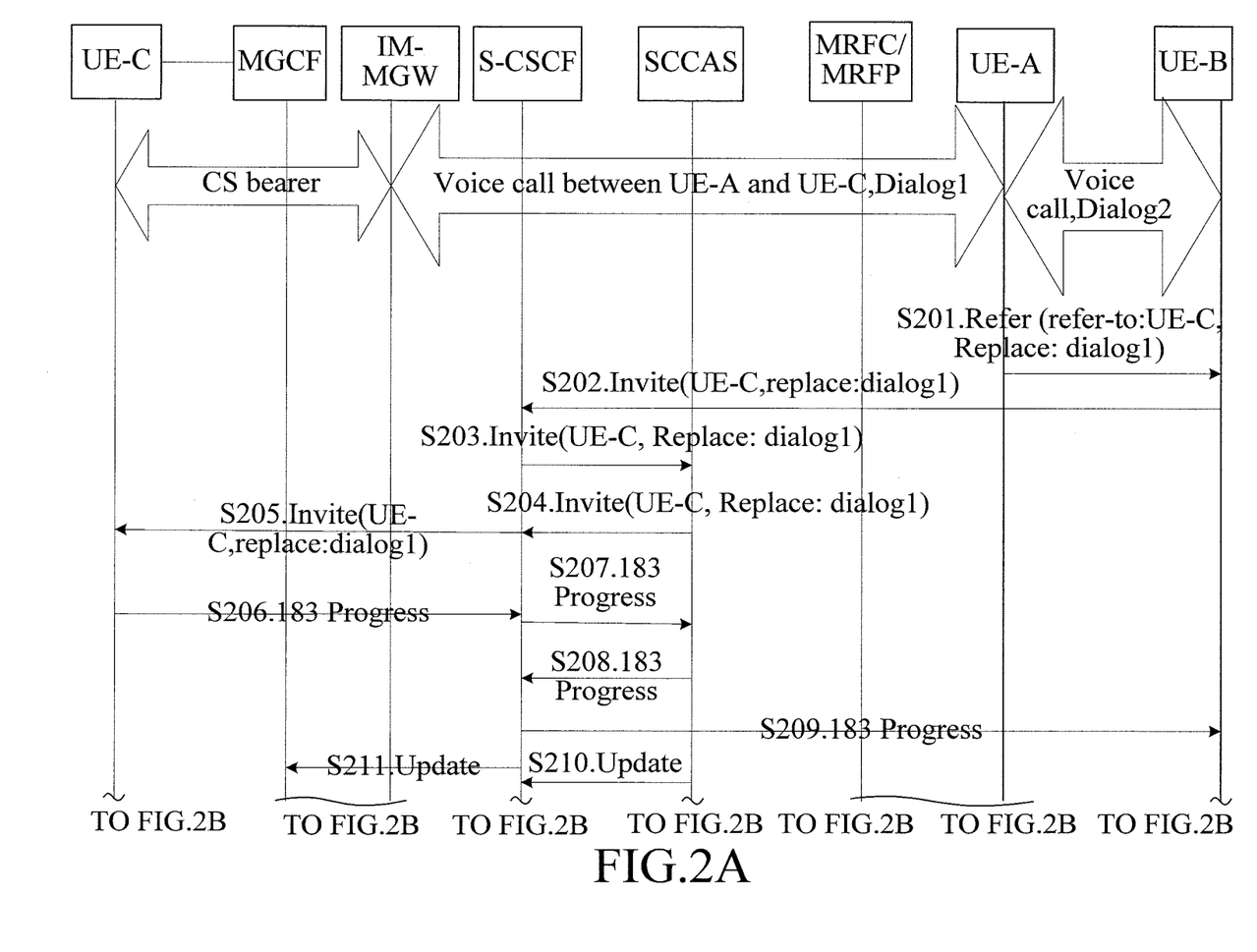
FIGS. 2A and 2B are flow charts of Embodiment 1 according to a method of the present invention.
Figure 2B:
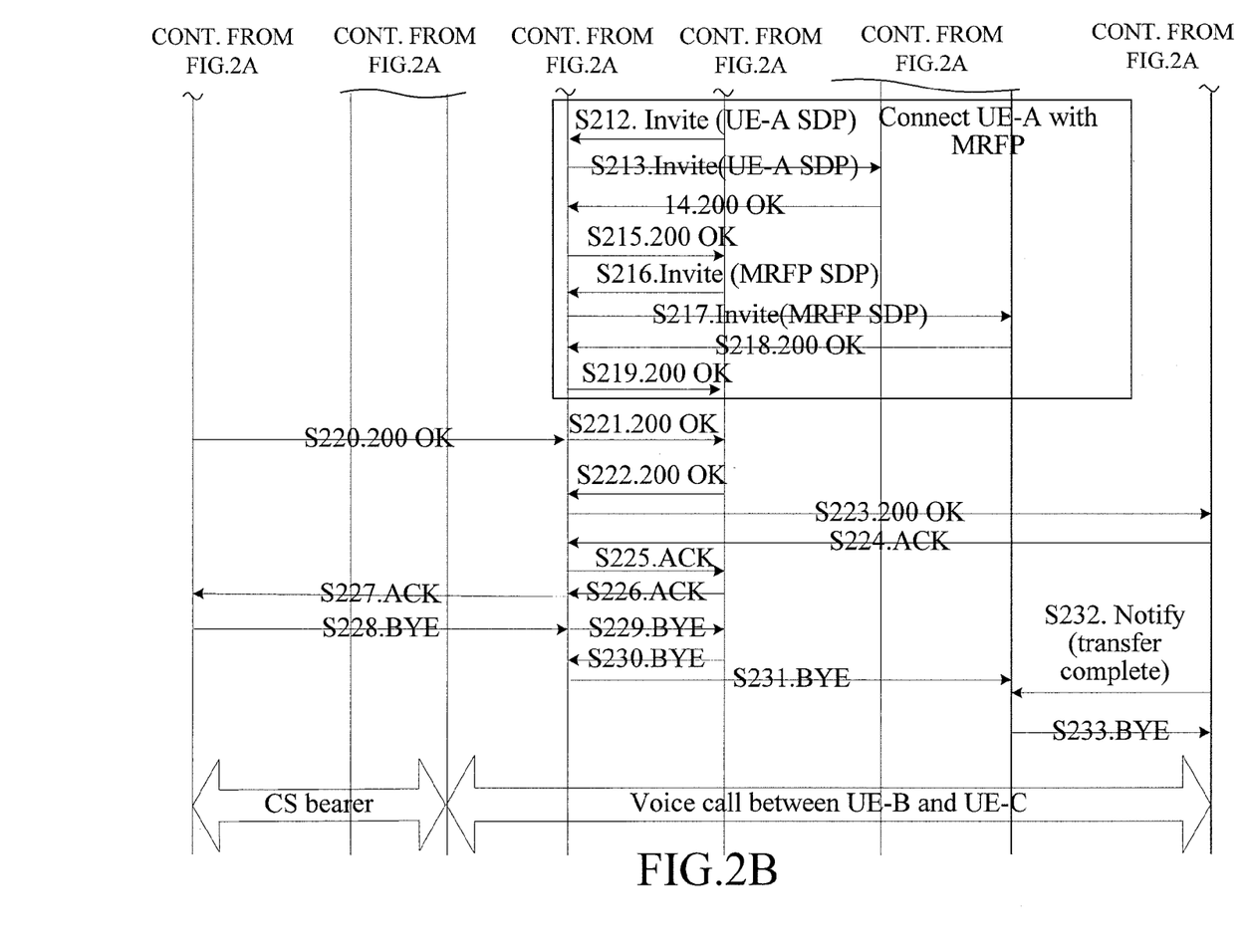

An ICS UE is used as a transfer target of a consult ECT service, and the ICS UE communicates with an SCC AS through a Gm interface. After receiving a message returned by the transfer target, the SCC AS connects an IP multimedia-media gateway (IM-MGW) with a transferee by using an Update message and connects a transferor with another gateway entity at the same time. As shown in FIGS. 2A and 2B, a UE-C is an ICS UE; a serving-call session control function (S-CSCF) and an SCC AS are network equipment serving the UE-C; S-CSCFs for a UE-A and a UE-B are not shown. There is a call connection between the UE-A and the UE-C, and a call connection between the UE-A and the UE-B; and the UE-A executes an ECT to establish a connection between the UE-B and the UE-C. The steps of Embodiment 1 are as follows:

In step S201, the UE-A initiates an ECT request to the UE-B by using a refer message, and informs the UE-B to connect with the UE-C by using a Refer-to message header of the Refer message; a session ID of a session between the UE-A and the UE-C, namely the dialog1 in FIGS. 2A and 2B, is carried in a Replace message header of the Refer message.

In step S202, the UE-B, after receiving the Refer message, generates an Invite message according to content of the Refer message, in which a called address of the Invite message is the UE-C, and content of a Replace message header of the Invite message is the same as that of the Replace message header of the received Refer message. The Invite message reaches the S-CSCF first.

In step S203, the S-CSCF sends the Invite message to the SCC AS of the UE-C.

In steps S204-S205, the SCC AS terminates the Invite message, generates a new Invite message, and sends the new Invite message to the UE-C through the S-CSCF.

In steps S206-S209, the UE-C returns a SIP 183 session progress message to the UE-B to inform the UE-B that the call request is being processed; besides a 183 message, a 180 message may also be used.

In steps S210-S211, the SCC AS sends an Update message to an MGW control function entity (MGCF) according to the received session progress message, and session description protocol (SDP) information of the UE-B (including the IP address and port number of the UE-B) is carried in the Update message. The message is used to inform the MGCF to connect the IM-MGW with the UE-B to prepare for following voice communication between the UE-B and the UE-C.

In steps S212-S213, the SCC AS sends an Invite message to a multimedia resource function controller (MRFC), and SDP information of the UE-A (including the IP address and port number of the UE-A) is carried in the message. The message is used to prepare for connecting the UE-A with a multimedia resource function processor (MRFP) afterwards.

In steps S214-S215, the MRFC returns a 200 OK confirmation message to the SCC AS, and SDP information of the MRFP (including the IP address and port number of the MRFP) is carried in the message.

In steps S216-S217, the SCC AS sends an Invite message to the UE-A, and SDP information of the MRFP (including the IP address and port number of the MRFP) is carried in the message.

In steps S218-S219, the UE-A returns a 200 OK confirmation message to the SCC AS.

In steps S220-S223, the UE-C returns a 200 OK confirmation message to the UE-B to confirm that the connection succeeds.

In steps S224-S227, the UE-B returns an ACK message to the UE-C.

In steps S228-S229, the UE-C, after confirming that the connection succeeds, breaks a connection with the SCC AS by using a BYE message according to the session ID in the Replace message header of the Invite message received in the step S205.

In steps S230-S231, the SCC AS breaks a connection with the UE-A by using a BYE message.

In step S232, the UE-B, after confirming that the connection with the UE-C succeeds, informs the UE-A by using a Notify message that transfer is completed.

In step S233, the UE-A breaks a connection with the UE-B by using a BYE message.

After the step S233, the UE-B and the UE-C starts a session connection; the connection between the UE-A and the UE-B, and the connection between the UE-A and the UE-C are broken.

For an ICS UE, no matter how many sessions the UE has, a CS media bearer is reused, that is, there is only one CS media bearer when the UE has multiple sessions. The function of an IM-MGW is to convert a CS media bearer into a PS media bearer, namely, into a real-time transport protocol (RTP). An attribute of the IM-MGW is that one CS media bearer may only correspond to one RTP connection. Therefore, when the ICS UE has multiple sessions, only one session can be in connection, and other sessions must be connected with other network elements. In this embodiment, the steps S212-S219 are intended to connect the UE-A as a transferor with the MRFP, so as to avoid disconnection from the transferor due to an error. This embodiment provides a solution to communication between an SCC AS and an ICS UE through a Gm interface.

It should be noted that the steps S210-S219 may be executed after the step S221 or the step S225, and the steps S212-S219 may be executed before the steps S210-S211. No matter when the steps S210-S219 are executed, one principle should be upheld: the steps S210-S211 and the steps S212-S219 must be executed consecutively. That is, the steps S210-S211 are executed first, and then the steps S212-S219 are executed; or the steps S212-S219 are executed first, and then the steps S210-S211 are executed.

Embodiment 2

Figure 3:
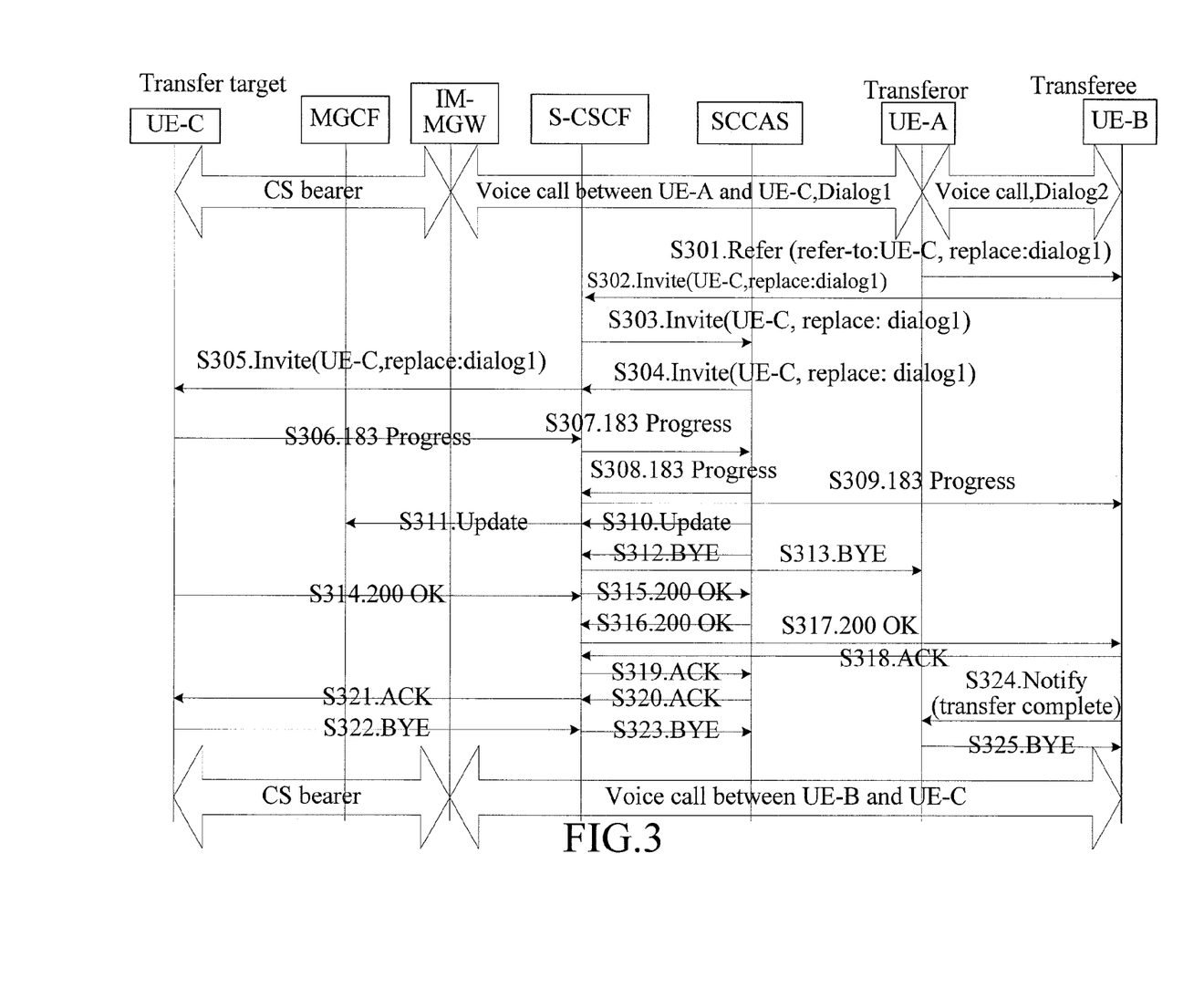
FIG. 3 is a flow chart of Embodiment 2 according to a method of the present invention.

An ICS UE is used as a transfer target of a consult ECT service, and the ICS UE communicates with an SCC AS through a Gm interface. After receiving a message returned by the transfer target, the SCC AS connects an IM-MGW with a transferee by using an Update message, and breaks a connection with a transferor by using a BYE message. As shown in FIG. 3, a UE-C is an ICS UE, an S-CSCF and an SCC AS are network equipment serving the UE-C; S-CSCFs for a UE-A and a UE-B are not shown. There is a communication connection between the UE-A and the UE-C, and a call connection between the UE-A and the UE-B; and the UE-A executes an ECT to establish a connection between the UE-B and the UE-C; specific steps of the embodiment II are as follows.

Steps S301-S311 are the same as steps S201-S211.

In steps S312-S313, the SCC AS sends a BYE message to the UE-A, so as to release a communication connection between the UE-A and the UE-C.

In steps S314-S317, the UE-C returns a 200 OK confirmation message to the UE-B to confirm that the connection succeeds.

In steps S318-S321, the UE-B returns an ACK message to the UE-C.

In steps S322-S323, the UE-C, after confirming that the connection succeeds, breaks a connection with the UE-A by using a BYE message according to the session ID in the Replace message header of the Invite message received in the step S305; and the SCC AS, after receiving the BYE message, terminates the BYE message and does not send the message to the UE-A.

In step S324, the UE-B, after confirming that the connection with the UE-C succeeds, informs the UE-A by using a Notify message that transfer is completed.

In step S325, the UE-A breaks a connection with the UE-B by using a BYE message.

After the step S325, the UE-B and the UE-C starts a session connection; the connection between the UE-A and the UE-B, and the connection between the UE-A and the UE-C are broken.

This embodiment provides another solution for a communication between an SCC AS and an ICS UE through a Gm interface. The SCC AS, after receiving the message returned by the ICS UE, actively breaks the connection with the transferor, so as to avoid disconnection of the transferor due to an error.

It should be noted that the steps S310-S313 may be executed after the step S315 or the step S319, and the steps S312-S313 may be executed before the steps S310-S311. No matter when the steps S310-S313 are executed, one principle should be upheld: the steps S310-S311 and the steps S312-S313 must be executed consecutively. That is, the steps S310-S311 are executed first, and then the steps S312-S313 are executed; or the steps S312-S313 are executed first, and then the steps S310-S311 are executed.

Embodiment 3

Figure 4A:
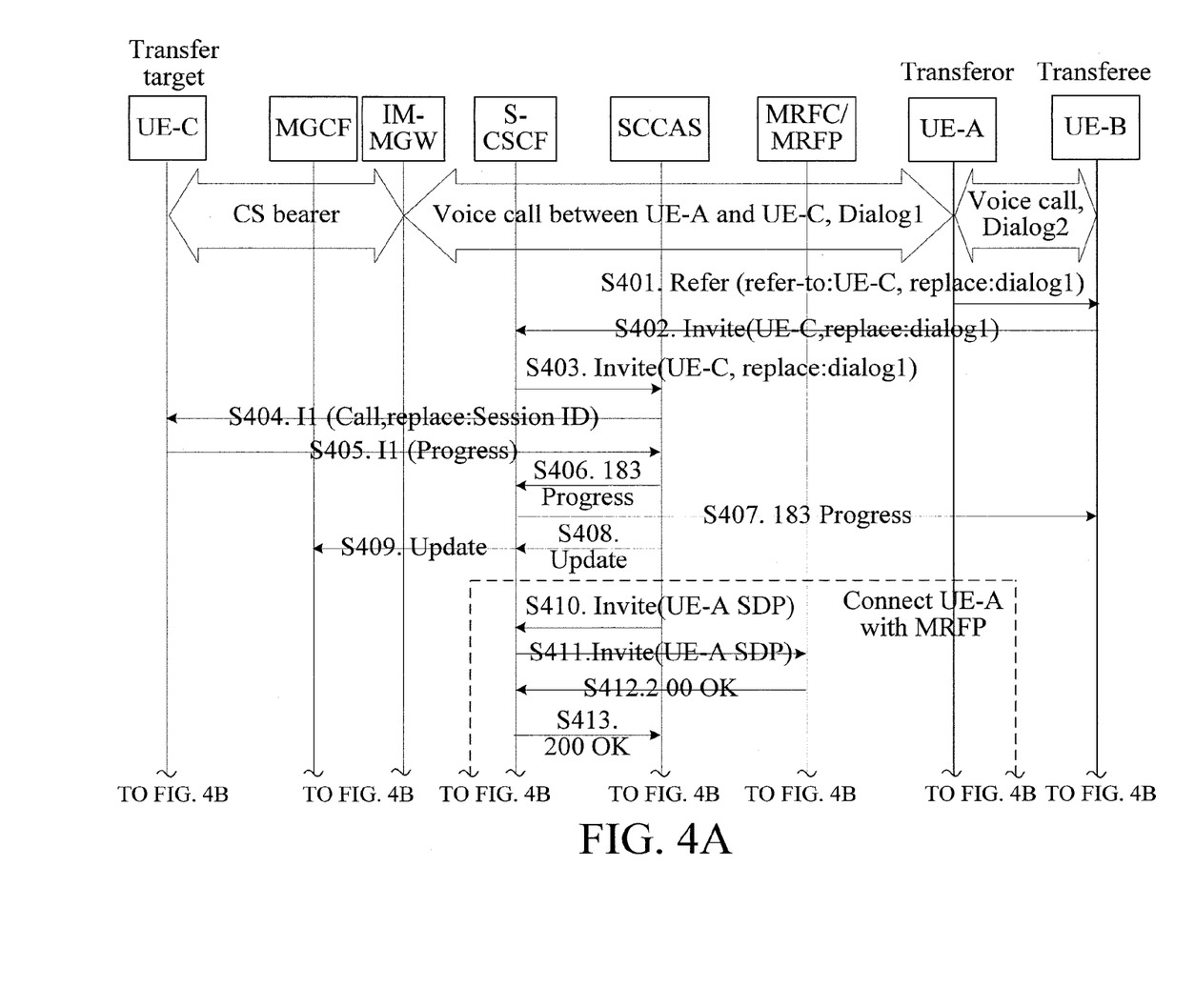
FIGS. 4A and 4B are flow charts of Embodiment 3 according to a method of the present invention.
Figure 4B:
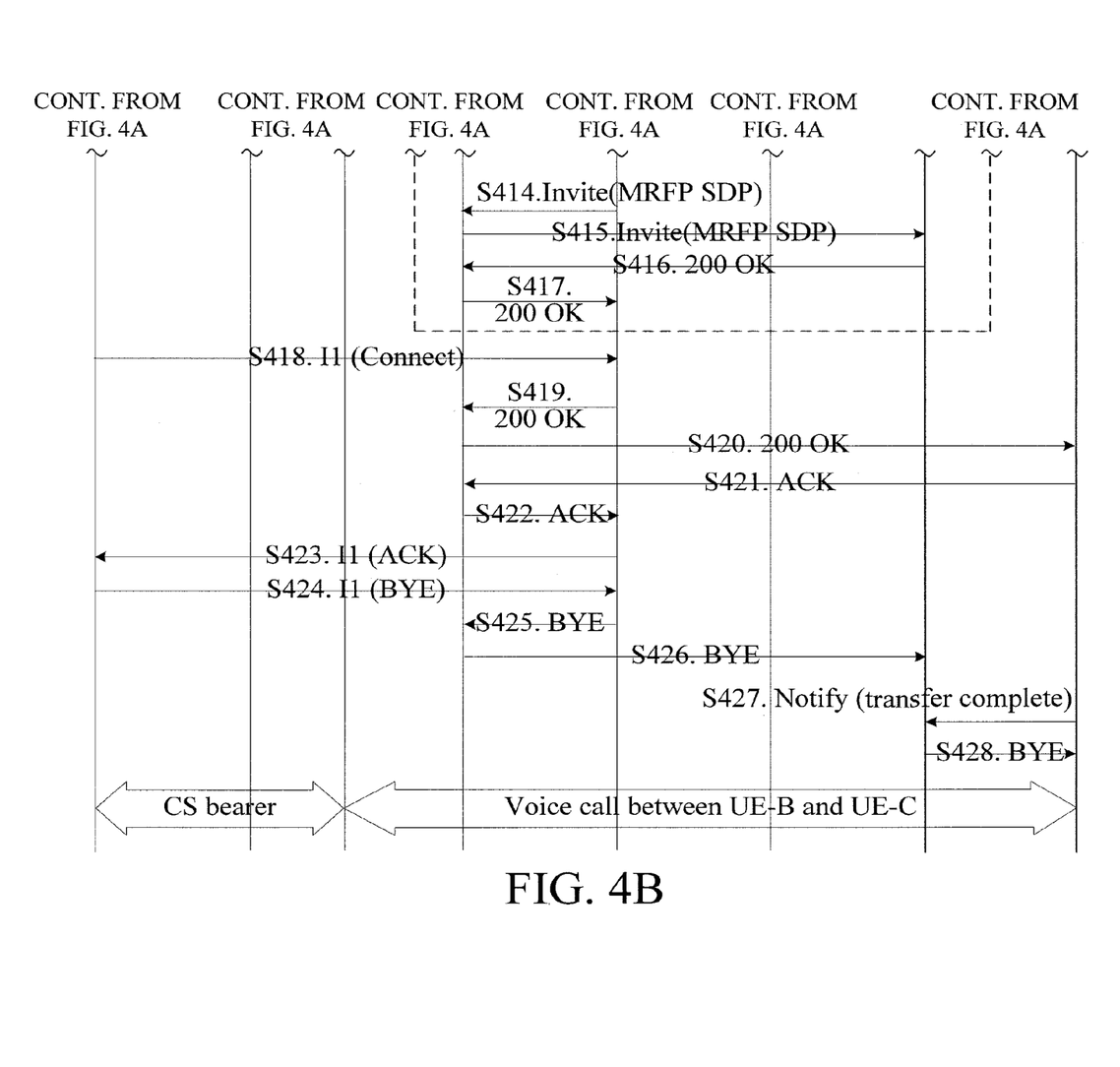

An ICS UE is used as a transfer target of a consult ECT service, and the ICS UE communicates with an SCC AS through an Il interface. After receiving a message returned by the transfer target, the SCC AS connects an IM-MGW with a transferee by using an Update message, and connects a transferor with another gateway entity at the same time. As shown in FIGS. 4A and 4B, a UE-C is an ICS UE, an S-CSCF and an SCC AS are network equipment serving the UE-C; S-CSCFs for a UE-A and a UE-B are not shown. There is a communication connection between the UE-A and the UE-C, and a call connection between the UE-A and the UE-B; and the UE-A executes an ECT to establish a connection between the UE-B and the UE-C; specific steps of the embodiment III are as follows.

In step S401, the UE-A initiates an ECT request to the UE-B by using a Refer message, and informs the UE-B to connect with the UE-C by using a Refer-to message header of the Refer message; a session ID of a session between the UE-A and the UE-C, namely, the dialog1 in FIGS. 4A and 4B, is carried in a Replace message header of the Refer message.

In step S402, the UE-B, after receiving the Refer message, generates an Invite message according to content of the Refer message, in which a called address of the Invite message is the UE-C, and content of a Replace message header of the Invite message is the same as that of the Replace message header of the received Refer message. The Invite message reaches the S-CSCF first.

In step S403, the S-CSCF sends the Invite message to the SCC AS of the UE-C.

In step S404, the SCC AS terminates the Invite message, and generates a circuit switched service call request message, hereinafter called an Il message; the SCC AS needs to convert an SIP session ID in the Replace message header into a session ID in an Il interface. The Il message generated by the SCC AS at least includes the information of: the call request, replace key words, and a session ID. The SCC AS sends the message to the UE-C through the Il interface.

In step S405, the UE-C returns a session in progress message Il to the SCC AS through the Il interface.

In steps S406-S407, the SCC AS translates the Il message into a SIP 183 session progress message, and sends it to the UE-B. The message is used to inform the UE-B that the call request is being processed. In addition to a 183 message, a 180 message may also be used In steps S408-S409, the SCC AS sends an Update message to an MGCF according to the received session progress message, and SDP information of the UE-B (including the IP address and port number of the UE-B) is carried in the Update message. The message is used to inform the MGCF to connect the IM-MGW with the UE-B to prepare for following voice communication between the UE-B and the UE-C.

Steps S410-S417 are the same as steps S212-S219.

In step S418, the UE-C returns a Connect message to the SCC AS through the Il interface.

In steps S419-S420, the SCC AS converts the Connect message of the Il interface into a SIP 200 OK message, and sends the message to the UE-B to confirm that the connection succeeds.

In steps S412-S422, the UE-B returns an ACK message to the SCC AS.

In step S423, the SCC AS sends the connect ACK message to the UE-C through the Il interface.

In step S424, the UE-C sends a BYE message to the SCC AS through the Il interface, so as to break a connection with the SCC AS.

In steps S425-S426, the SCC AS breaks a connection with the UE-A by using a BYE message. Session-related information resources between the UE-C and the UE-A are released.

In step S427, the UE-B, after confirming that the connection with the UE-C succeeds, informs the UE-A by using a Notify message that transfer is completed.

In step S428, the UE-A breaks a connection with the UE-B by using a BYE message.

After the step S428, the UE-B and the UE-C starts a session connection; the connection between the UE-A and the UE-B, and the connection between the UE-A and the UE-C are broken.

In the embodiment, the steps S410-S417 are intended to connect the UE-A as a transferor with the MRFP, so as to avoid disconnection of the transferor due to an error. The difference of this embodiment from Embodiment 1 is that the ICS UE communicates with the SCC AS using an Il interface. In the step S404, the SCC AS, after receiving the session request message with a Replace message header initiated by a transferee, generates an Il message carrying replace key words and a session ID, and sends the Il message to the transfer target through an Il interface. In the step S418, the transfer target releases session-related information between the transfer target and the transferor according to the replace key words and the session ID received through the Il interface. This embodiment provides a solution for a communication between an SCC AS and an ICS UE through an Il interface.

It should be noted that, in this embodiment, the steps S408-S409 and the steps S410-S417 must be executed consecutively. That is, the steps S408-S409 are executed first, and then the steps S410-S417 are executed; or the steps S410-S417 are executed first, and then the steps S408-S409 are executed.

Embodiment 4

Figure 5:
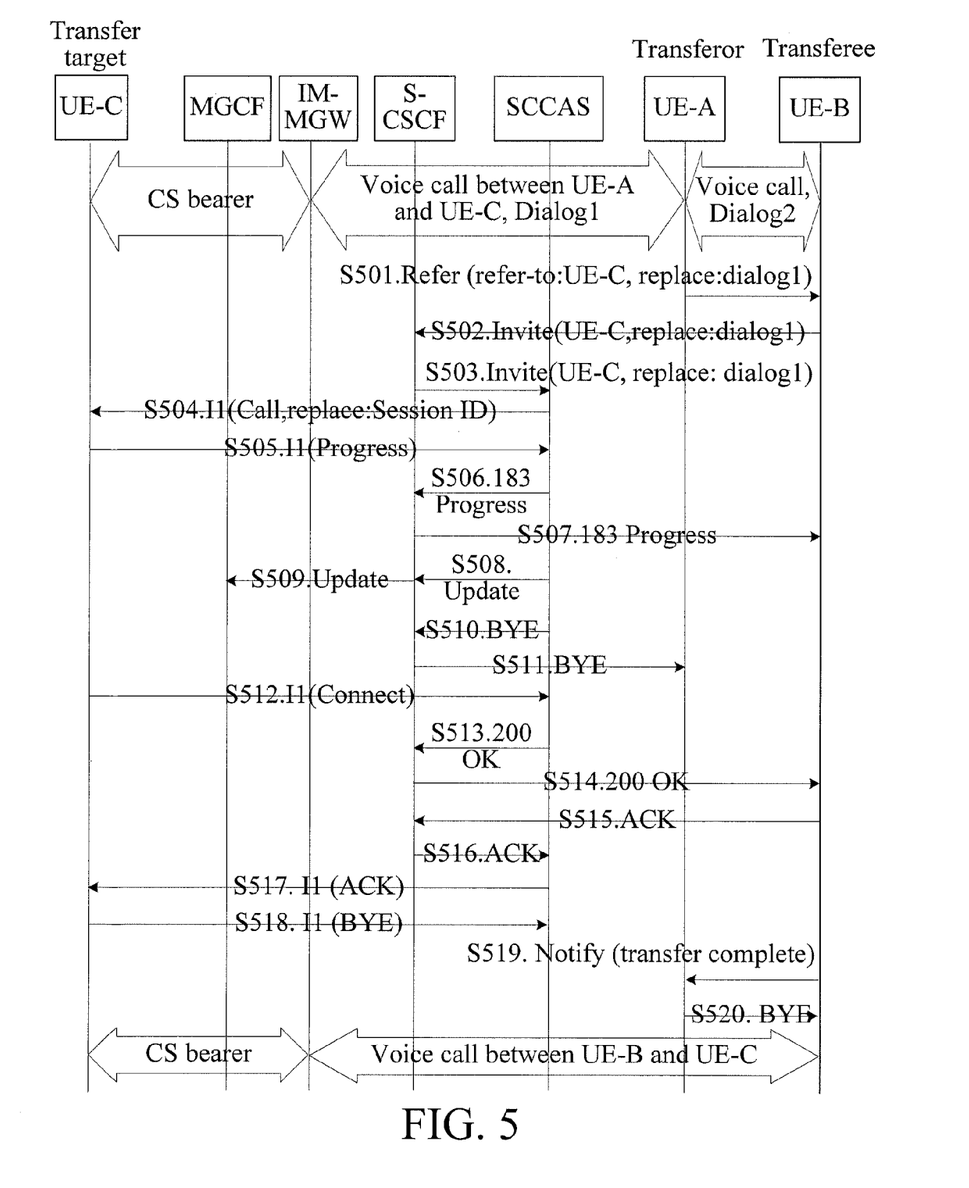
FIG. 5 is a flow chart of Embodiment 4 according to a method of the present invention.

An ICS UE is used as a transfer target of a consult ECT service, and the ICS UE communicates with an SCC AS through an Il interface. After receiving a message returned by the transfer target, the SCC AS connects an IM-MGW with a transferee by using an Update message, and breaks a connection with a transferor by using a BYE message. As shown in FIG. 5, a UE-C is an ICS UE, an S-CSCF and an SCC AS are network equipment serving the UE-C; S-CSCFs for a UE-A and a UE-B are not shown. There is a communication connection between the UE-A and the UE-C, and a call connection between the UE-A and the UE-B; and the UE-A executes an ECT to establish a connection between the UE-B and the UE-C; specific steps of the embodiment IV are as follows.

Steps S501-S509 are the same as steps S401-S409.

In steps S510-S511, the SCC AS sends a BYE message to the UE-A, so as to release a communication connection between the UE-A and the UE-C.

In step S512, the UE-C returns a Connect message through the Il interface. At the same time, the UE-C releases session-related information with the UE-A according to the replace key words and the session ID received in the step S504.

In steps S513-S514, the SCC AS converts the Connect message of the I1 interface into a SIP 200 OK message, and sends the message to the UE-B to confirm that the connection succeeds.

In steps S515-S516, the UE-B returns an ACK message to the SCC AS.

In step S517, the SCC AS sends the connect ACK message to the UE-C through the I1 interface.

In step S518, the UE-C sends a BYE message to the SCC AS through the I1 interface.

In step S519, the UE-B, after confirming that the connection with the UE-C succeeds, informs the UE-A by using a Notify message that transfer is completed.

In step S520, the UE-A breaks a connection with the UE-B by using a BYE message.

After the S520, the UE-B and the UE-C starts a session connection; the connection between the UE-A and the UE-B, and the connection between the UE-A and the UE-C are broken.

This embodiment provides another solution for a communication between an SCC AS and an ICS UE through an I1 interface. The SCC AS, after receiving the message returned by the ICS UE, actively breaks the connection with the transferor, so as to avoid disconnection of the transferor due to an error.

It should be noted that the steps S508-S511 may be executed after the step S512 or the step S516, and the steps S510-S511 may be executed before the steps S508-S509. No matter when the steps S508-S511 are executed, one principle should be upheld: the steps S508-S509 and the steps S510-S511 must be executed consecutively. That is, the steps S508-S509 are executed first, and then the steps S510-S511 are executed; or the steps S510-S511 are executed first, and then the steps S508-S509 are executed.

Figure 6:
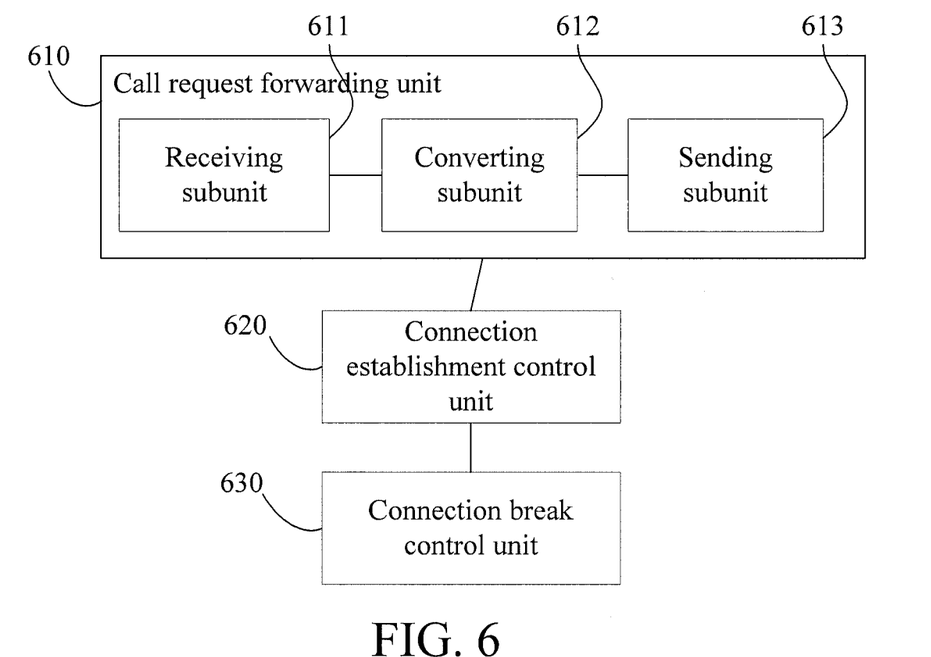
FIG. 6 is a schematic structural view of an SCC AS according to an embodiment of the present invention.

In an embodiment, the present invention provides a service centralization & continuity application server (SCC AS) serving an IMS centralized service user equipment (ICS UE), as shown in FIG. 6. The SCC AS includes a call request forwarding unit 610, a connection establishment control unit 620, and a connection break control unit 630.

The call request forwarding unit 610 is configured to receive a call request message sent by a second UE, and send the call request message to a third UE, where the third UE is an ICS UE.

The connection establishment control unit 620 is configured to receive a message returned by the third UE according to the call request, and control the third UE to establish a connection with the second UE.

The connection break control unit 630 is configured to receive a message returned by the third UE according to the call request, and control the third UE to break a connection with the first UE.

The call request forwarding unit 610 may further include a receiving subunit 611, a converting subunit 612, and a sending subunit 613.

The receiving subunit 611 is configured to receive a call request message sent by a second UE;

The converting subunit 612 is configured to convert the call request message received by the receiving subunit 611 into a circuit switched service call request message; in which the circuit switched service call request messages carries a session identifier and a replacement indication identifier, the session identifier is a session identifier between the first UE and the third UE, and the replacement indication identifier is used to indicate replacing the session between the first UE and the third UE by a session between the second UE and third UE; and The sending subunit 613 is configured to send the circuit switched service call request message obtained by the converting subunit 612 to the third UE.

In an embodiment, the present invention further provides another SCC AS serving an ICS UE, which includes a call request forwarding unit, a return message receiving subunit, a connection establishment control subunit, and a connection break control subunit.

The call request forwarding unit is configured to receive a call request message sent by a second UE, and send the call request message to a third UE, in which an instruction for replacing a call between a first UE and the third UE is carried in the call request.

The return message receiving subunit is configured to receive a message returned by the third UE according to the call request.

The connection establishment control subunit is configured to control the third UE to establish a connection with the second UE according to the message received by the return message receiving subunit.

The connection break control subunit is configured to control the third UE to break a connection with the first UE according to the message received by the return message receiving subunit.

The above call request forwarding unit may include a receiving subunit, a converting subunit, and a sending subunit.

The receiving subunit is configured to receive a call request message sent by a second UE;

The converting subunit is configured to convert the call request message received by the receiving subunit into a circuit switched service call request message; where the circuit switched service call request messages carries a session identifier and a replacement indication identifier, the session identifier is a session identifier between the first UE and the third UE, and the replacement indication identifier is used to indicate replacing the session between the first UE and the third UE by a session between the second UE and third UE; and The sending subunit is configured to send the circuit switched service call request message obtained by the converting subunit to the third UE.

The above SCC AS serves the ICS UE, and is used as a user agent to establish and control an IMS session in an IMS domain in place of the ICS UE, and to complete the adaptation between a CS domain signaling and an IMS domain SIP signaling.

Figure 7:
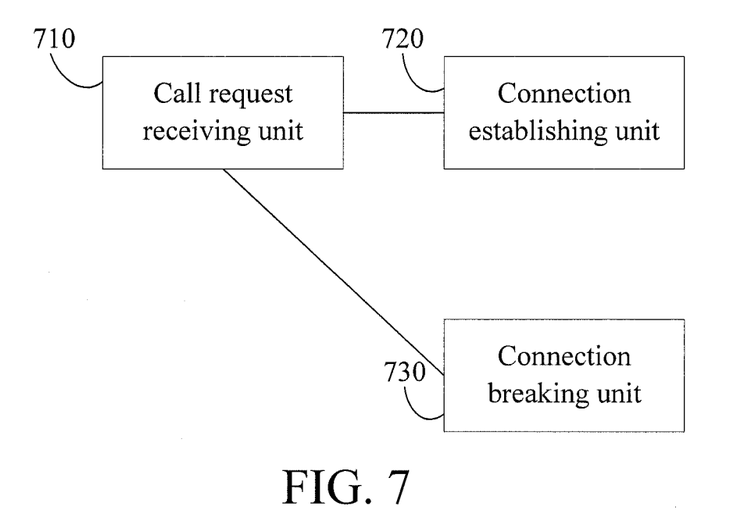
FIG. 7 is a schematic structural view of an ICS UE according to an embodiment of the present invention.
Figure 8:
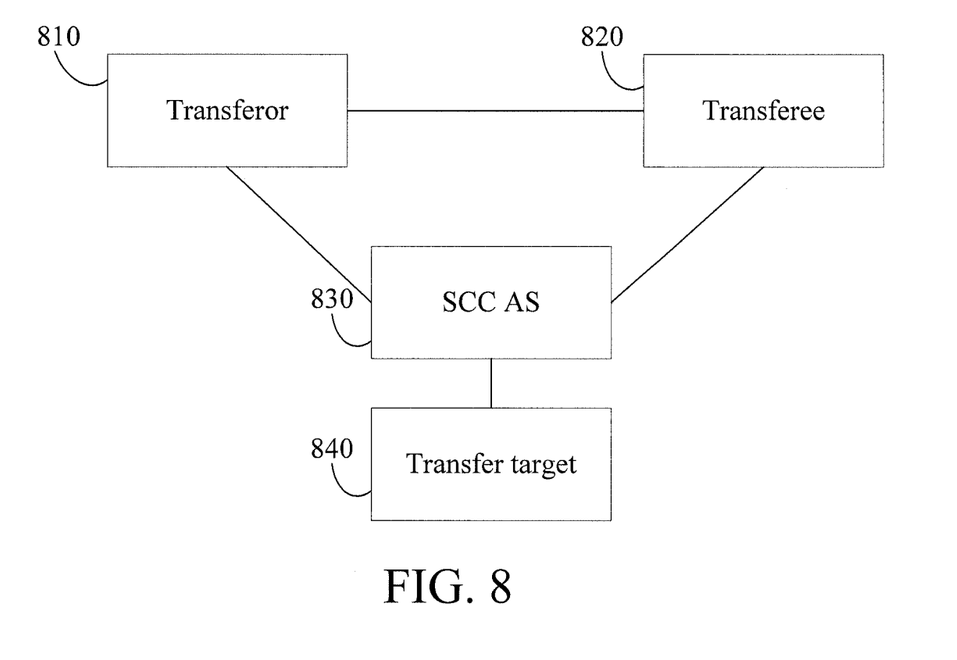
FIG. 8 is a schematic structural view of a mobile communication system according to an embodiment of the present invention.

In an embodiment, the present invention provides an ICS UE, which includes a call request receiving unit 710, a connection establishing unit 720, and a connection breaking unit 730.

The call request receiving unit 710 is configured to receive a call request sent by a second UE and forwarded by an SCC AS, where an instruction for replacing a call between a first UE and the SCC AS is carried in the call request.

The connection establishing unit 720 is configured to return a message to the SCC AS according to the call request received by the call request receiving unit 710, and establish a connection with the second UE by using the return message.

The connection breaking unit 730 is configured to return a message to the SCC AS according to the call request received by the call request receiving unit 710, and break a connection with the first UE by using the return message.

In an embodiment, the present invention provides another ICS UE, which includes a call request receiving unit and a connection updating unit.

The call request receiving unit is configured to receive a call request sent by a second UE and forwarded by an SCC AS, where an instruction for replacing a call between a first UE and the SCC AS is carried in the call request.

The connection updating unit is configured to return a message to the SCC AS according to the call request received by the call request receiving unit, and, by using the return message, establish a connection with the second UE and break a connection with the first UE.

The above ICS UE may be used as a transfer target of a consult ECT service, so as to receive a call request sent by a transferor, establish a connection with a transferee according to the call request, and break a connection with the transferor, thus completing the consult ECT process.

In an embodiment, the present invention provides a mobile communication system, as shown in FIG. 7. The system includes three user terminals, namely a transferor 810, a transferee 820 and a transfer target 840, and an SCC AS 830, in which the transfer target is an ICS UE.

The transferor 810 is configured to initiate a call transfer request.

The transferee 820 is configured to receive the call transfer request initiated by the transferor 810, and send a call request to the transfer target 840.

The SCC AS 830 is configured to receive the call request sent by the transferee 820, and send the call request to the transfer target 840; receive a message returned by the transfer target 840 according to the call request, establish a connection with the transferee 820, and break a connect with the transferor 810; and The transfer target 840 is configured to receive the call request sent by the SCC AS 830, return a message to the SCC AS 830 according to the call request, and indicate the SCC AS 830 to establish a connection with the transferee 820 and break a connection with the transferor 810.

The transfer target may communicate with the SCC AS through a packet switched service control signaling channel or a circuit switched service control signaling channel.

Embodiments about the equipment and the system are described in a simple way because they basically correspond to embodiments of the method; for relevant parts, please refer to the description of embodiments about the method. The embodiments of the equipment and the system are merely exemplary. Units described as separate components may be or may not be physically separated. Components shown as units may be or may not be physical units, that is, may be integrated or distributed to a plurality of network units. Some or all of the modules may be selected to achieve the objective of the solution of the embodiment according to actual demands. Persons of ordinary skill in the art can understand and implement the present invention without creative efforts.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, and an optical disk.

It should be noted that the above descriptions are merely preferred embodiments of the present invention, and those skilled in the art may make various improvements and refinements without departing from the principal of the invention. All such modifications and refinements are intended to be covered by the present invention.

What is claimed is:

1. A method for realizing explicit call transfer, comprising:
by a service centralization & continuity application server (SCC AS) receiving a call request sent by a second user equipment (UE), converting the call request sent by the second UE into a circuit switched service call request message, and sending the circuit switched service call request message to a third UE;
carrying a session identifier and a replacement indication identifier in the circuit switched service call request message, wherein the session identifier is a session identifier between a first UE and the third UE, and the replacement indication identifier is used to indicate replacing a session between the first UE and the third UE by a session between the second UE and the third UE; and
receiving a message returned by the third UE according to the circuit switched service call request message, controlling the third UE to establish a connection with the second UE, and controlling the third UE to break a connection with the first UE;
wherein the third UE is an IP multimedia subsystem centralized service UE (ICS UE).

2. The method according to claim 1, wherein the controlling the third UE to establish the connection with the second UE comprises:
the SCC AS connecting an IP multimedia-media gateway (IM-MGW) with the second UE, and connecting the third UE with the second UE through the IM-MGW.

3. The method according to claim 1, wherein the controlling the third UE to break the connection with the first UE comprises:
the SCC AS connecting the first UE with a multimedia resource function processor (MRFP);
the SCC AS receiving a connection break indication sent by the third UE, and breaking the connection with the third UE; and
the SCC AS sending the connection break indication to the first UE, and breaking the connection with the first UE.

4. The method according to claim 1, wherein the controlling the third UE to break the connection with the first UE comprises:
the SCC AS sending the connection break indication to the first UE, and breaking the connection with the first UE; and
the SCC AS receiving a connection break indication sent by the third UE, and breaking the connection with the third UE.

5. A service centralization & continuity application server (SCC AS), comprising a processor, the processor performing operations comprising:
receiving a call request sent by a second user equipment (UE);
converting the call request sent by the second UE into a circuit switched service call request message that carries a session identifier and a replacement indication identifier in the circuit switched service call request message, wherein the session identifier is a session identifier between a first UE and the third UE, and the replacement indication identifier is used to indicate replacing a session between the first UE and the third UE by a session between the second UE and the third UE;
sending the circuit switched service call request message to a third UE; and
controlling the third UE to establish a connection with the second UE and controlling the third UE to break a connection with the first UE, responsive to a message from the third UE according to the circuit switched service call request message;
wherein the third UE is an IP multimedia subsystem centralized service UE (ICS UE).

\* \* \* \* \*